United States Patent [19]

Merkel

[11] Patent Number: 4,532,756
[45] Date of Patent: Aug. 6, 1985

[54] GRASS CATCHING RECEPTACLE FOR BOTH DUMPING AND BAGGING

[75] Inventor: Eugene C. Merkel, South Milwaukee, Wis.

[73] Assignee: Bolens Corporation, Port Washington, Wis.

[21] Appl. No.: 636,339

[22] Filed: Jul. 31, 1984

[51] Int. Cl.³ .............................................. A01D 35/22
[52] U.S. Cl. ....................................... 56/202; 56/16.6; 56/320.2
[58] Field of Search ..................... 56/202, 16.6, 320.2, 56/13.3

[56] References Cited

U.S. PATENT DOCUMENTS

| | | | |
|---|---|---|---|
| 3,934,392 | 1/1976 | Moery et al. | 56/202 |
| 3,974,631 | 8/1976 | Rhodes | 56/202 |
| 4,015,406 | 4/1977 | Witt et al. | 56/202 |
| 4,156,337 | 3/1978 | Knudson | 56/202 |
| 4,168,600 | 9/1979 | Klug et al. | 56/202 |

OTHER PUBLICATIONS

Brochure, The Toro Company, 1982.
Ariens Riding Mower Brochure, date unknown.
832/1132 Lawn Tractor Brochure, The Toro Company, 1981.

*Primary Examiner*—Jay N. Eskovitz

[57] ABSTRACT

A grass catching receptacle for a lawn and garden mowing machine having fixed and movable clamshell portions forming a hopper that is opened at the bottom to dump accumulated clippings. A dumping handle is fixed to the movable clamshell portion and carries a control lever for releasing a cable-operated latch that secures the bottoms of the clamshell portions in their closed position. The movable clamshell portion and a flip-up lid are pivoted around a common axis across the back of the mowing machine, the lid pivoting upwardly and forwardly when the movable clamshell portion is pivoted for a dumping operation, and also pivoting upwardly and forwardly when lifted for access to the hopper through a top opening. A wire frame is disposed across the top opening for holding disposable bags in an open and upright position when a bagging operation is desired.

4 Claims, 6 Drawing Figures

GRASS CATCHING RECEPTACLE FOR BOTH DUMPING AND BAGGING

BACKGROUND OF THE INVENTION

The invention relates to lawn and garden equipment, and especially to collection devices that attach to ridable machines used for cutting grass, picking up leaves and the like.

Such collection devices have been constructed to empty their contents in different ways. Some devices require the detachment of a hopper or some other portion. Others provide a dumping operation. With the widespread use of disposable lawn and garbage bags, some devices have been designed to accommodate such bags, thereby eliminating the transfer of clippings from a hopper to one or more such bags.

There are, however, still shortcomings in the known art. At least one manufacturer has offered one attachment for dumping and another for bagging. A machine owner who desires to bag grass and who desires to collect and dump leaves is faced with buying two attachments. The attachment for dumping does not provide access for disposable bags, and does not suggest combining the two operations.

The known devices for accomodating disposable bags often still require removal of a hopper or other hardware when removing the bags, and this is considered to be inconvenient.

SUMMARY OF THE INVENTION

The invention provides a grass catching receptacle for both dumping and bagging.

The receptacle has a hopper of the clamshell type for dumping and a flip-up lid for access to the hopper for installing and removing disposable bags. The lid is mounted to pivot with one portion of the clamshell hopper when the bottom of the hopper is opened for dumping. It may also be lifted independently of the pivoting clamshell portion to open the hopper from the top when working with disposable bags. The flip-up lid and the pivoting portion of the clamshell hopper are both mounted to pivot around an axis transverse to the rear end of the ridable machine and near the top edge of a fixed front wall of the hopper.

One of the more detailed aspects of the invention is found in a latching mechanism that holds the hopper closed at the bottom. This latching mechanism is controlled through a cable and a squeeze-type control handle mounted on the dump handle.

Another of the more detailed aspects of the invention includes a wire bag frame for holding open the disposable bags that are places in the hopper.

Other aspects and advantages of the invention will be apparent from the detailed description which follows and which refers to the drawings that are incorporated herein. The drawings and description pertain to a preferred form of the invention, but the invention can also be embodied in other forms, and therefore, reference should be made to the claims herein for determining the scope of embodiments to which the invention applies.

DETAILED DESCRIPTION OF THE PREFERRED EMBODIMENT

Figure 1:
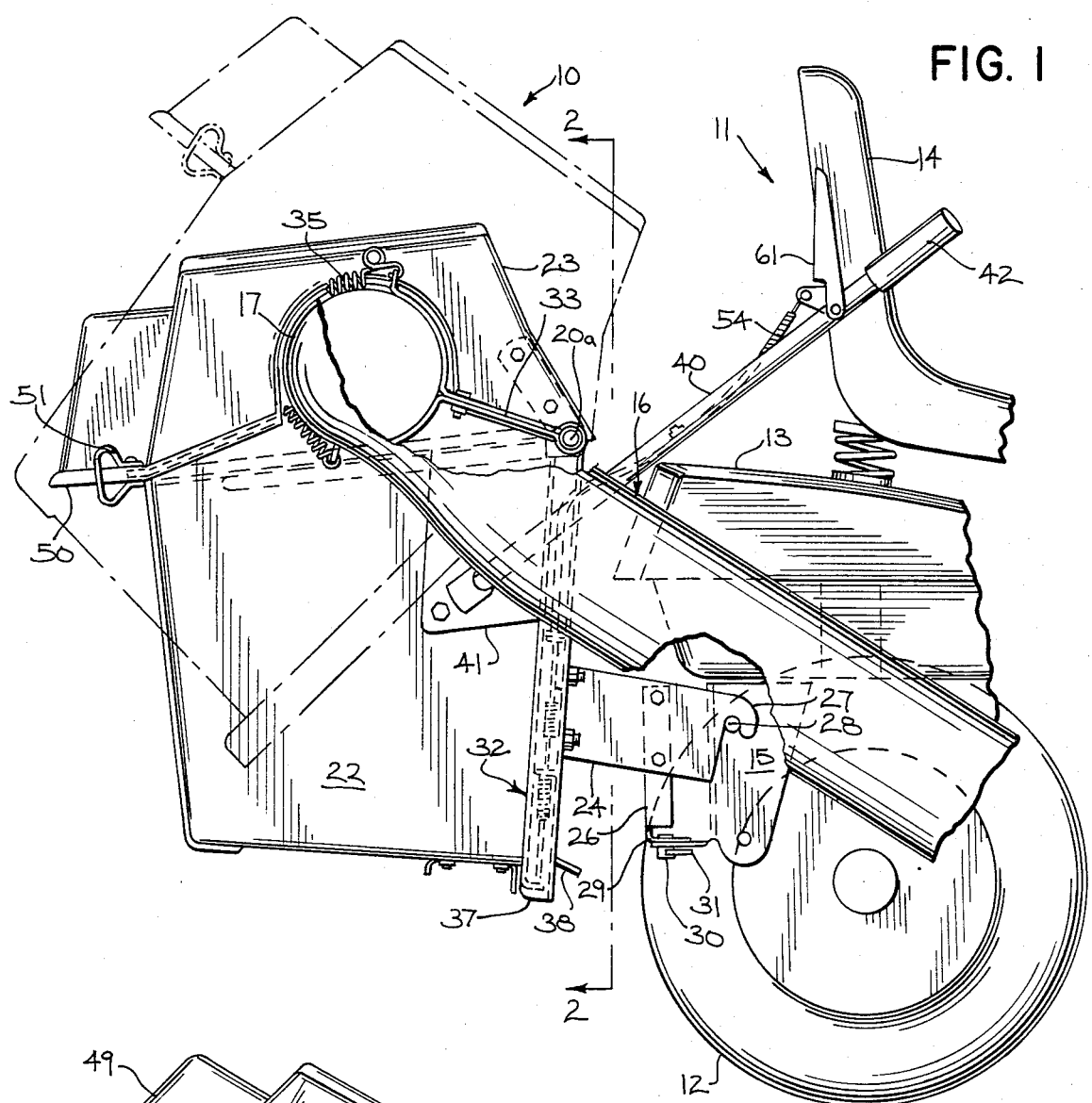
FIG. 1 is a side view in elevation of a grass catching receptacle of the invention attached to a rear end of a lawn and garden tractor.

Referring first to FIG. 1, the invention is incorporated in a grass catching assembly 10 attached to a rear end of a lawn and garden tractor 11. While the invention will be described in connection with a small tractor, it could also be used with a smaller, more limited purpose machine, such as a riding mower, or with larger tractors.

The parts of the tractor 11 that are seen in FIG. 1 include its rear wheels 12, a rear deck 13 over the wheeels 12, an operator's seat 14 mounted on the rear deck 13, and a mounting plate 15 suitably attached to the tractor frame or chassis below the back portion of the rear deck 13. Also seen in FIG. 1 is a grass discharge chute 16 that rises upwardly and rearwardly along the right side of the tractor 11 to convey clipped vegetation from the cutting area which is forward of the rear wheels 12 and along the ground. At its back end, the chute 16 forms an elbow 17 for side entry into the grass catching assembly 10.

Figure 5:
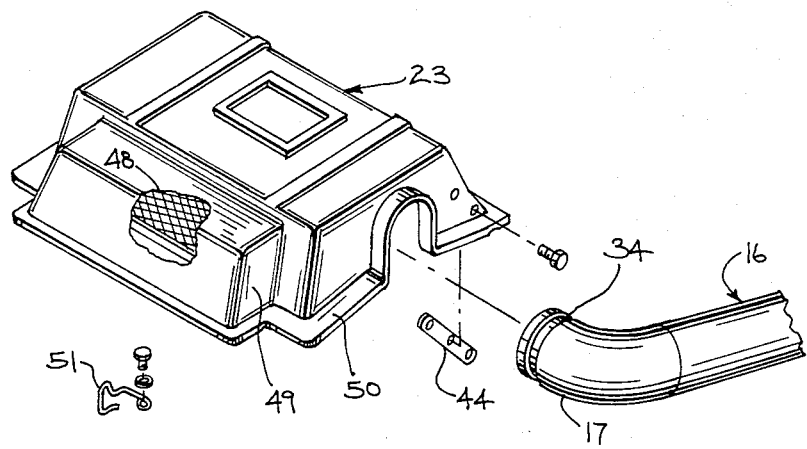
FIG. 5 is an exploded perspective view of the parts in grass catching receptacle assembly of FIG. 1.
Figure 5:
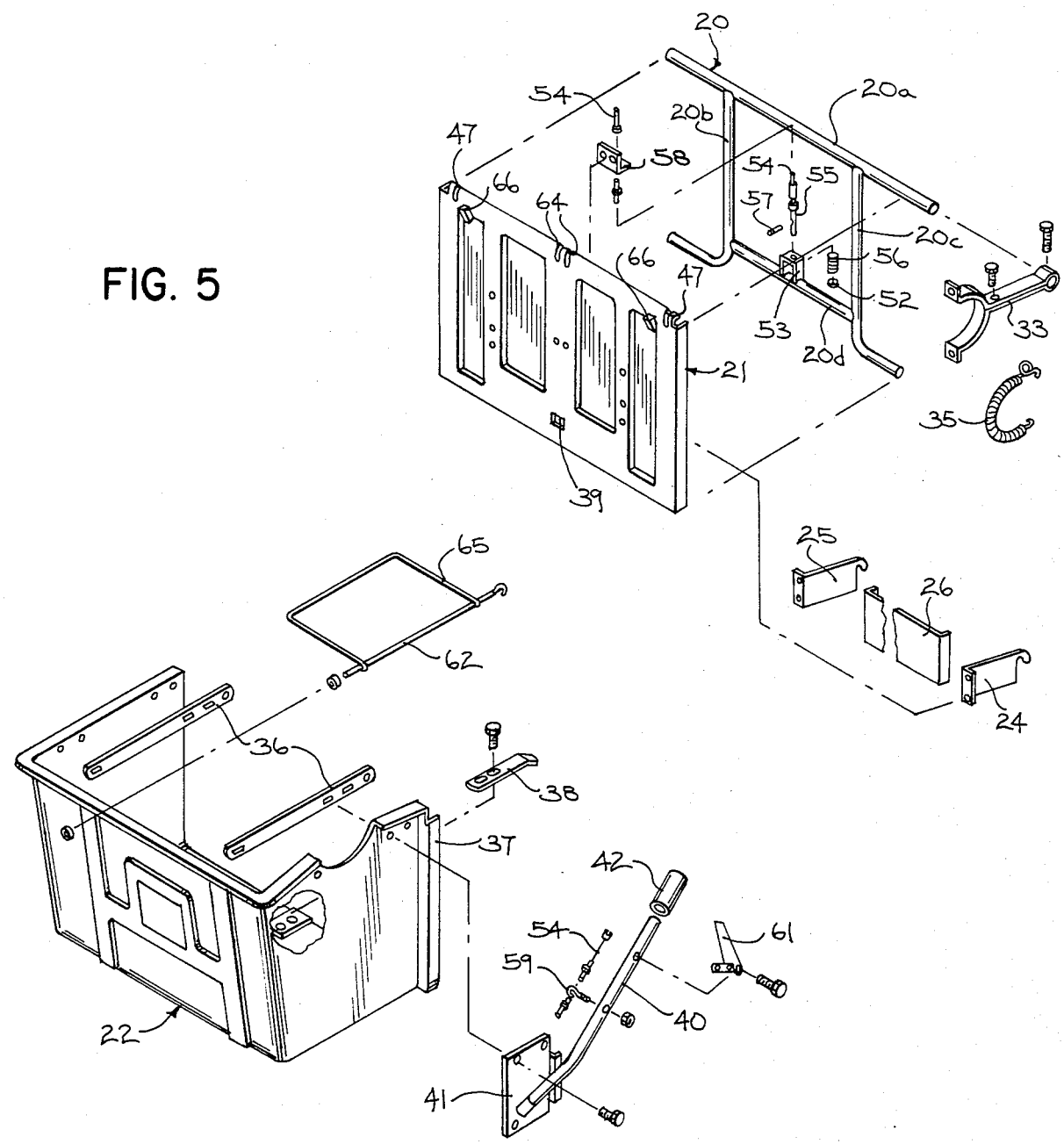

The larger components of the assembly in FIG. 1 are seen individually in FIG. 5 and include a tubular frame 20, a hopper front wall 21 with several recesses, a grass carrier 22 which forms the side, back and bottom walls of a hopper, and a downwardly opening, concave lid 23.

The frame 20 and the hopper front wall 21 are mounted across the rear end of the tractor 11 using a hitch formed by parts seen in FIG. 5, including a right side plate 24, a left side plate 25, and a transverse plate 26. The right side plate 24 and the left side plate 25 form downwardly curving hook portions 27 that are seen best in FIG. 1. These are fitted over outwardly projecting support rods 28 on opposite sides of the tractor mounting plate 15. The transverse hitch plate 26 is bolted between the side plates 24 and 25 and intermediate their front and back ends. The hitch plate 26 also extends downwardly below them to a bottom flange 29 that is secured with a hitch pin 30 and a retaining pin 31 to a bottom flange on a tractor mounting plate 15. The side plates 24 and 25 also have flanges at their rear extremities seen in perspective in FIG. 5, and as seen in FIGS. 1-3, the frame 20 and the hopper front wall 21 are bolted to these flanges.

Looking in particular at the frame 20 in FIG. 5, there is an upper transverse tubular member 20a that provides a support for the lid 23 and for the grass discharge chute 16 as will be explained in more detail below. The upright, spaced apart tubular members 20b and 20c of the frame 20 provide a place for attachment of the hitch plates to the front wall 21. The upright members 20b and 20c have outwardly curving feet at the bottom which fit into the corners of the recessd front wall 21 as seen best in FIG. 2. The frame 20 also has a second transverse tubular member 20d, shorter than the first, that extends between the uprights 20b and 20c just above the feet to support a latching mechanism 32 to be described in more detail below.

Figure 4:
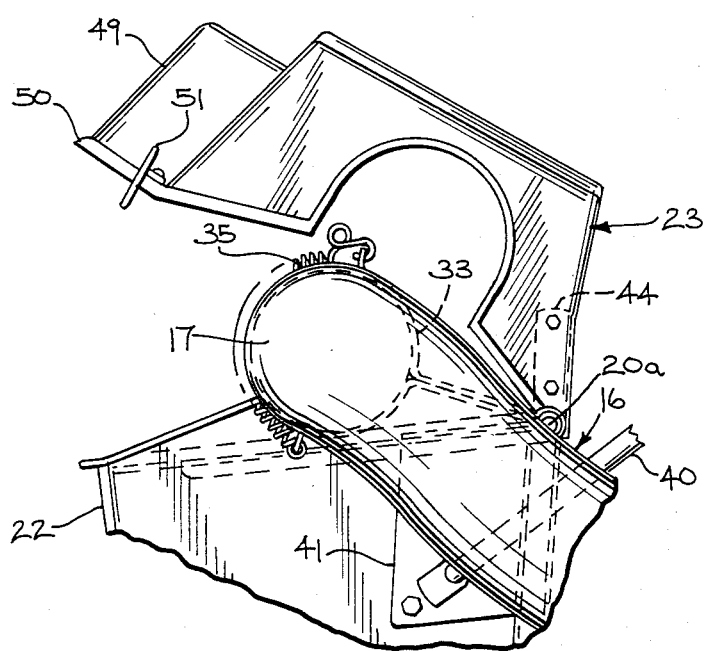
FIG. 4 is a detail view showing how the lid of the hopper in FIG. 1 can be opened.
Figure 2:
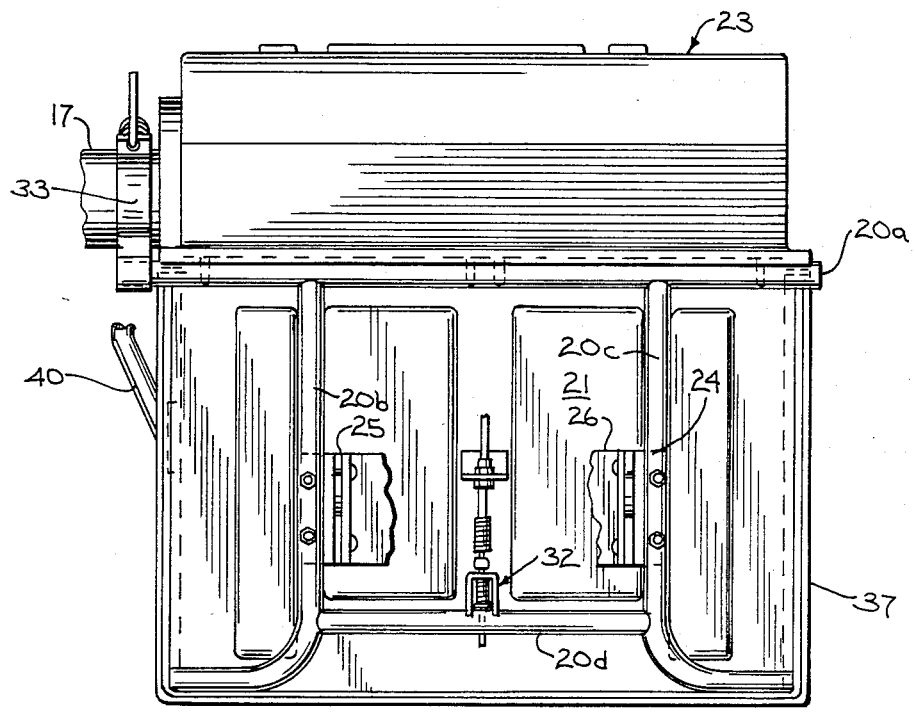
FIG. 2 is an elevation view taken in the plane indicated by line 2—2 in FIG. 1.
Figure 3:
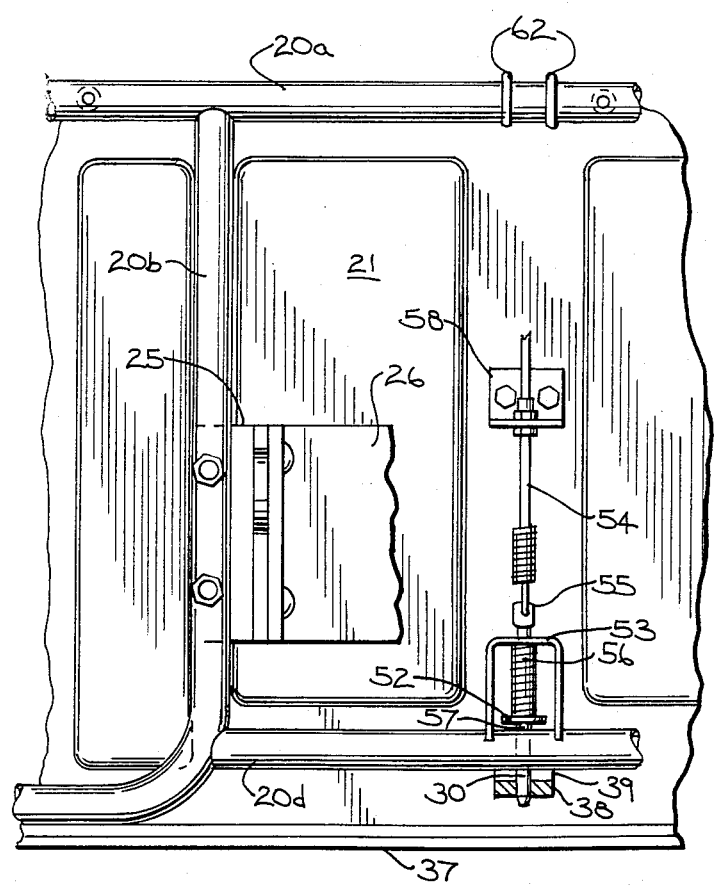
FIG. 3 is a detail view of a latching mechanism seen in FIG. 2.

Referring to FIG. 2, the upper member of the frame has projections extending laterally beyond the sides of the front wall 21. At the upper left in FIG. 2 (at the right rear of the tractor in FIG. 1) there is a discharge chute support frame 33 that supports the elbow of the grass discharge chute on the main frame 20. Referring to FIG. 5, the support frame 33 forms a sleeve at one end that is bolted onto the upper frame member 20a. The support frame 33 also forms an arm extending from this mounting sleeve to a half-sleeve for receiving the discharge end of the elbow 17 on the grass discharge chute 16. The elbow 17 has a groove 34 around its discharge end in which the half-sleeve is received, and in which the elbow 17 is secured with a long, coiled spring 35 bending approximately 180 degrees around the elbow 17 and hooked to the half-sleeve on opposite ends as seen in FIGS. 1 and 4. It should now be apparent that the elbow 17 of the discharge chute 16 is fixed relative to the frame 20, so that it will not move with the movable portions of the grass catching assembly 10.

Referring again to FIG. 5, the grass carrier 22 is pivotally mounted to the frame 20 by hinge arms 36 that bolt into the grass carrier 22 inside and just below its upper rim. Above the hinge bars 36 the rim is provided with a flange that forms a laterally projecting ledge around the top opening of the grass carrier 22. Around the front opening of the grass carrier 22 is laterally extending flange is further formed into a recessed rim 37 with a forwardly extending portion that fits closely around the sides and bottom of the stationary front hopper wall 21 as seen in FIG. 2. The hinge bars 36 extend forward, as seen in FIGS. 1 and 5, to the region of the recessed rim 37 where holes are provided to receive the ends of the upper frame member 20a. The grass carrier 22 is thereby overbalanced to pivot to a closed position against the front hopper wall and around its sides and bottom.

The grass carrier 22 has an engagement bracket 38 bolted onto its bottom near its lower front edge as seen in FIG. 5. When the grass carrier 22 is closed against the hopper front wall 21 the forward tip of this engagement bracket 38 projects through a rectangular opening 39, that is centrally located along the lower portion of the hopper front wall as seen in FIG. 5. This bracket 38 is engaged by a latching mechanism to secure the grass carrier 22 to the hopper front wall 21.

Also seen in FIG. 5 is a dump handle 40, which is welded to a mounting plate 41 that is bolted onto the upper right portion of the grass carrier 22. This dump handle 40 has a grip 42 on its upper end which is located within reach of an operator as illustrated in FIG. 1.

Figure 6:
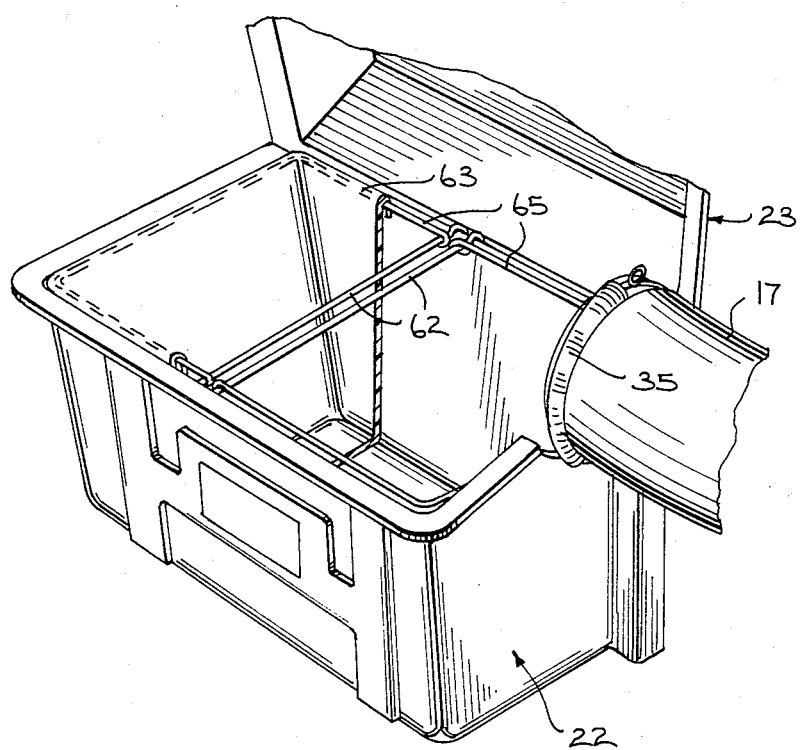
FIG. 6 is a perspective view of the interior of the receptacle of FIG. 1 showing a wire bag frame.

Still referring to FIGS. 1 and 5, the lid 23 is also pivotally mounted to the upper frame member 20a using a respective pair of hinge bars 44 that are relatively shorter than those used for the grass carrier 22. These are bolted inside the front portion of the lid as seen in phantom in FIG. 1. The shorter hinge bars 44 extend through slits 47 in the hopper front wall along with the hinge bars 36 for the grass carrier 22. The shorter hinge bars 44 encircle the upper frame member 20a to allow the lid 23 to be pivoted upward as seen in FIG. 4. The lid 23 is lifted off the hopper as seen in FIGS. 4 and 6 for access through the top opening, or as seen in FIG. 1 in phantom, the lid 23 will pivot with the grass carrier 22 around the axis provided by the upper frame member 20a when operated in the dumping mode.

As seen in FIG. 5, the lid 23 is formed as a generally rectangular concave dish with angularly sloping side walls. There is an opening in the right side wall for communication with the exit of the discharge elbow 17. There is a screened vent 48 in the rear wall that is hidden inside a deflector 49 formed on the rear wall. The deflector 49 acts as a dust shield and directs air exhausted through the vent 48 in a downward direction. The lid 23 also has a laterally projecting flange 50 around its perimeter. A wire form locking hook 51 is mounted on the lid flange 50 at the right and left rear corner of the dished portion of the lid 23. This hook 51 clips the flange 50 on the lid 23 to the flange around the top opening of the grass carrier 22 to secure the two together for operation in the dumping mode seen in FIG. 1. This hook 51 can also be pivoted around a vertical axis to release the lid 23, so that it can be lifted off the grass carrier 22 as seen in FIG. 4.

The grass catching assembly 10 is closed as seen in FIG. 1 when vegetation is being collected. A latching mechanism 32 seen in phantom in FIG. 1 is used to secure the grass carrier 22 to the front wall 21 of the hopper by engaging the bracket 38 mentioned earlier. The latching mechanism 32 is seen best in FIG. 3 and includes a latch bracket 53 attached to the lower transverse frame member 20d. A cable assembly 54 is hooked to a latch pin 55 that extends through the bracket and the lower transverse frame member 20d. A compression spring 56 is coiled around the latch pin 55 in the area enclosed by the latch bracket 53 and frame member 20d. A roll pin 57 is inserted through the latch pin 55 below the coiled spring 56 and a washer 52. When the pin 55 is lifted it will compress the spring 56 to provide the force to return the latch pin 55 to its latching position, where it extends through the transverse member 20d as seen in FIG. 3. The latch pin 55 is actuated through the cable assembly 56 which is mounted by a bracket 58 seen in FIG. 3 and also by an eye bolt 59 on the dump handle 40 as seen in FIG. 5. The cable assembly 54 is connected at its other end to a latch control lever 61 pivotally mounted near the upper end of the dump handle 40. The control lever 61 is concave to allow the operator to close it against the dump handle 40 and pull on the cable to withdraw the latch pin 55 from its latching position.

The dump mode of operation is illustrated in FIG. 1. To operate the assembly 10 in this mode, the human operator releases the latch pin 55 by operating the latch control lever 61 on a dump handle 40, and then pushes down on the dump handle 40 to pivot the grass carrier 22 backwardly and upwardly, away from the front wall 21 of the hopper. With the cover locks 51 secured, the lid 21 will also pivot as seen in phantom in FIG. 1. Grass catchers that open downwardly in this fashion are sometimes referred to as the clamshell type. In this construction the front wall 21 of the hopper forms one part of the clamshell while the grass carrier 22 forms the other.

After the collected material has been dumped, the handle 40 is allowed to pivot in the counterclockwise direction as seen in FIG. 1 until the grass carrier 22 is again closed against the front wall 21. The engagement bracket 38 has a camming portion that aids it in sliding under the latch pin 55, which is then urged through a hole in the bracket 38 by the spring 56 to secure the hopper latching mechanism 52.

The flip-up lid 23 provides for a second mode of operation in which material is collected in disposable bags 63, which are positioned in the grass carrier 22 just below the opening for the discharge elbow 17 as seen in FIG. 6. To assist the bagging operation, a wire frame is provided as seen in FIG. 6 for proper positioning of the bags 63, which are of the type commonly used for garbage receptacles or for collecting lawn materials. The frame has a pair of support rods 62 extending from front to back across the top opening of the hopper. The support rods 62 form hooks at their front ends and these extend through slits 64 in the front wall 21 as seen in FIG. 5 to fit over the upper frame member 20a as seen best in FIG. 3. The back ends of the support rods 62 are fastened to the back wall of the grass carrier 22. Wire bails 65 in FIG. 6 are mounted to rotate around the support rods 62 between a laterally extending position and an upright position. When a wire bail 65 is in its laterally extending position it is supported by one of the rests 66 formed on the hopper front wall 21 in FIG. 5. When the upper edges of a disposable lawn or garbage bag 63 are wrapped around the wire bail 65 and the bail 65 is returned to its lateral position a portion of the bag 63 will be trapped between the bail 65 and the rest 66 to help retain the bag 63 in its open upright position. When it is desired to remove the bag 63, the bail 65 is simply lifted upward to its upright position near the middle of the grass carrier 22 and out of the way for removal of the bag 63. The hooked ends of the support rods 62 permit wire frame to be left in place even when used in the dumping mode of operation.

This detailed description has been by way of example, and not by way of limitation. Therefore, to distinguish that which is essential to the invention from that which has been described by way of example only, the following claims are made.

I claim:

1. A grass catching receptacle for mounting to a rear end of a ridable machine, the receptacle comprising:
   a first hopper clamshell portion fixed across the rear end of the riding mower;
   a second hopper clamshell portion with a top opening, with a front opening, and with an upper forward portion pivotally coupled at respective locations along an upper portion of the first hopper clamshell portion to overbalance the second hopper clamshell portion to close against the first hopper clamshell portion, the second hopper clamshell portion being pivotable away from the first hopper clamshell portion to dump material out of the front opening; and
   a flip-up lid disposed to cover the top opening, the lid being mounted along one of its edge portions to pivot with the pivoting of the second hopper clamshell portion, and to pivot independently of the second hopper clamshell portion when lifted for access through the top opening.

2. The grass catching receptacle of claim 1, further comprising:
   a dumping handle fixed to the second hopper clamshell portion and extending forward of the receptacle to within reach of an operator of the riding mower;
   further comprising a cable-actuated latch mechanism securing the second hopper clamshell portion to the first hopper clamshell portion; and
   further comprising a control lever mounted to the dumping handle and operably connected to the cable-actuated latch mechanism for operation thereof to release the second hopper clamshell portion for dumping.

3. The grass catching receptacle of claim 1 further comprising:
   a support rod mounted on the second hopper clamshell portion and extending across the top opening from front to back; and
   further comprising a wire bail mounted at its ends to the support rod to pivot laterally around the support rod and provide a frame for holding a bag in upright open position within the hopper formed by the hopper clamshell portions.

4. The grass catching receptacle of claim 1, wherein the flip-up lid and the second hopper clamshell portion are mounted to pivot around a common axis transverse to the rear end of the ridable machine.

* * * * *